(12) United States Patent
Joyce et al.

(10) Patent No.: US 9,047,106 B1
(45) Date of Patent: Jun. 2, 2015

(54) MANAGING APPLICATION FEATURES

(75) Inventors: Scott E. Joyce, Foxborough, MA (US);
Robert A. Ballantyne, Mansfield, MA (US); Peter Chen, Charlton, MA (US);
Vidhi Bhardwaj, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 515 days.

(21) Appl. No.: 12/825,930

(22) Filed: Jun. 29, 2010

(51) Int. Cl.
*G06F 9/44* (2006.01)
*G06F 9/45* (2006.01)
*G06F 9/445* (2006.01)
*G06F 17/22* (2006.01)

(52) U.S. Cl.
CPC .............. *G06F 9/44521* (2013.01); *G06F 8/67* (2013.01); *G06F 17/2247* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 6,374,260 B1 * | 4/2002 | Hoffert et al. ........................ 1/1 |
| 6,476,828 B1 * | 11/2002 | Burkett et al. ................. 715/760 |
| 7,043,472 B2 * | 5/2006 | Aridor et al. ........................ 1/1 |
| 7,386,835 B1 * | 6/2008 | Desai et al. .................... 717/117 |
| 8,307,357 B2 * | 11/2012 | Bergman et al. .............. 717/174 |
| 2004/0215600 A1 * | 10/2004 | Aridor et al. ...................... 707/3 |
| 2005/0125787 A1 * | 6/2005 | Tertitski et al. ............... 717/162 |
| 2005/0138614 A1 * | 6/2005 | Nelson et al. ................. 717/162 |
| 2005/0160414 A1 * | 7/2005 | Parnanen et al. ............. 717/148 |
| 2006/0041879 A1 * | 2/2006 | Bower et al. .................. 717/162 |
| 2007/0055936 A1 * | 3/2007 | Dhanjal et al. ................ 715/700 |
| 2008/0147416 A1 * | 6/2008 | Hill et al. ...................... 717/107 |
| 2008/0263536 A1 * | 10/2008 | Duggan et al. ................ 717/168 |
| 2010/0229083 A1 * | 9/2010 | Mouri et al. .................. 715/234 |

OTHER PUBLICATIONS

ISAW Developer's Manual, Feb. 6, 2002, 41 pages, [retrieved on Oct. 3, 2012], Retrieved from the Internet: <URL:http://ftp.sns.gov/ISAW/Documents/ISAWDeveloperManual.pdf>.*
Nielsen, H., Install the W3C Reference Code, Jan. 31, 2004, 4 pages, [retrieved on Oct. 6, 2012], Retrieved from the Internet: <URL:http://web.archive.org/web/20040131225057/http://sunhe.jinr.ru/docs/w3c/readme.html>.*
Lindholm, T., A Three-way Merge for XML Documents, Proceedings of the 2004 ACM symposium on Document engineering , 2004, pp. 1-10, [retrieved on Jan. 15, 2015], Retrieved from the Internet: <URL:http://dl.acm.org/>.*
Bovet, L., XML merging made easy, JavaWorld.com, Jul. 10, 2007, 7 pages, [retrieved on Jan. 15, 2015], Retrieved from the Internet: <URL:http://www.javaworld.com/javaworld/jw-07-2007/jw-07-xmlmerge.html>.*

\* cited by examiner

*Primary Examiner* — Thuy Dao
*Assistant Examiner* — Geoffrey St Leger
(74) *Attorney, Agent, or Firm* — Krishnendu Gupta; Jason A. Reyes; John T. Hurley

(57) ABSTRACT

A method is used in managing application features. A first XML file is extracted from a first JAR file, and a second XML file is extracted from a second JAR file. Based on an identifier that is common to the first and second XML files and a directory structure that is common to the first and second JAR files, a merging operation is executed on the first and second XML files. An application feature is derived from the results of the merging operation.

17 Claims, 8 Drawing Sheets

```
Node node = null;
FxURLClassLoader loader = FxServiceFactory.getInstance ( )
       .getServiceClassLoader ( );

InputStream [ ] io = loader.getDirListAsStream (_strLocation);
if (io ! = null) {
  // load each of the files
  node = FxXMLLoader.readAndMergeXML (io);

} else {
  FxCoreLogManager.getCoreLogger (this) .error (
       "Invalid File path: " + _strLocaton);
}
```

FIG. 6

```
src\config\replicas\subsection\replicas-tasks\tasklist-replicassection.xml
```
— 710

View  Tools  Macros  Configure  Window  Help

```xml
<?xml version="1.0" encoding="UTF-8" standalone="yes"?>
<root>
   <collapsiblePanes
      Id="REPLICAS_TASKS_SECTION_Id"                                    — 720
      classname="com.emc.guitoolkit.collapsiblepane.FxCollapsiblePanesContainer">
      <viewhandler>
         <linkpane
            resource_bundle="com.emc.navisphere.sections.replicas.resources.replicas"
            resource_key="SNAPSHOTS_SECTION"
            sortorder="0">
            <link
               resource_bundle="com.emc.navisphere.sections.replicas.resources.replicas"
               resource_key="SNAPVIEW_CREATE_SNAPSHOT_LINK">
               <actionhandler
                   key="SNAP_CREATE_SNAPSHOT"
                   classname="com.emc.navisphere.gui.plugins.snapview.SnapviewActions">
                  <rule
                      classname="com.emc.navisphere.common.NaviRuleRolesValidator"
                      featurecheck="NaviSnap_SnapViewFeature.EV_SnapCopyFeature"
                      OrCondition="true>
                  </rule>
               </actionhandler>
            </link>
            <link
               resource_bundle="com.emc.navisphere.sections.replicas.resources.replicas"
               resource_key="SNAPVEW_START_SESSION_LINK">
               <actionhandler
                   key="SNAP_START_SESSION"
                   classname="com.emc.navisphere.gui.plugins.snapview.SnapviewActions">
                  <rule
                      classname="com.emc.navisphere.common.NaviRuleRolesValidator"
                      featurecheck="NaviSnap_SnapViewFeature.EV_SnapCopyFeature"
                      OrCondition="true">
                  </rule>
               </actionhandler>
            </link>
            <link
               resource_bundle="com.emc.navisphere.sections.replicas.resources.replicas"
               resource_key="SNAPVIEW_WIZARD_LINK"
               <actionhandler key="SNAPVIEW_WIZARD_START"
                   classname="com.emc.navisphere.gui.plugins.snapview.localreplicawizard.LocalReplicaConfigWizardActions">
               </actionhandler>
            </link>
         </linkpane>
      </viewhandler>
      <viewhandler>
         <linkpane
            resource_bundle="com.emc.navisphere.sections.replicas.resources.replicas"
            resource_key="CLONES_SECTION"
            sortorder="1">
            <link
               resource_bundle="com.emc.navisphere.sections.replicas.resources.replicas"
               resource_key="CLONEVIEW_CREATE_CLONEGROUP_LINK">
               <actionhandler key="101"
                   classname="com.emc.navisphere.gui.plugins.snapview.cloneview.CloneViewActions">
                  <rule
                      classname="com.emc.navisphere.common.NaviRuleRolesValidator"
                      featurecheck="NaviClone_CloneFeature"
```

FIG. 7

```
src\config\replicas\subsection\replicas-tasks\tasklist-replicassection.xml
```

```xml
<?xml version="1.0" encoding="UTF-8" standalone="yes"?>
<root>
  <collapsiblePanes>
    <collapsiblePane
        Id="REPLICAS_TASKS_SECTION_Id"
        classname="com.emc.guitoolkit.collapsiblepane.FxCollapsiblePanesContainer">
      <viewhandler>
        <linkpane
            resource_bundle="com.emc.rm.launchrm.resources.rm"
            resource_key="APP_CONSISTENT_REP"
            sortorder="5">
          <link
              resource_bundle="com.emc.rm.launchrm.resources.rm"
              resource_key="LAUNCH_RM">
            <actionhandler key="OTHER_SUPPORT_LAUNCH_RM"
                classname="com.emc.rm.launchrm.LauchRMFromManagerAction">
            </actionhandler>
          </link>
        </linkpane>
      </viewhandler>
    </collapsiblePane>
  </collapsiblePanes>
</root>
```

FIG. 8

MANAGING APPLICATION FEATURES

BACKGROUND

1. Field of the Invention

The present invention relates to managing application features.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

With respect to ways of handling such management, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object orientated programming language and a platform on which to run the Java applications. Java is both a compiled and an interpreted language. The source code that has been written by the application developer is compiled into an intermediate form called a Java bytecode, which is a platform independent language. At a client machine, the Java bytecodes are interpreted by the Java platform and the Java interpreter parses and runs each Java bytecode instruction on the computer. (If the Java bytecode is run as an applet which is described below, it may first be sent over the network to the client machine.)

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

A Java applet is a small program that can be sent along with a Web page to a user that can perform interactive animations, immediate calculations, or other tasks without having to send a user request back to the server. As an example, as shown in FIG. 1, a distributed computer system 100 includes a client computer 102 that is coupled to a server (host) computer 104. The computer 102 includes a browser application 106 that, in turn, includes a requested Web page 108 having an applet 110 embedded therein capable of performing various tasks. In most situations, the applet 110 is executed by a JVM 112 that in this example is also resident in the browser 106.

In order for the JVM 112 to execute the applet 110, the applet's requisite component files (including class files, images and sounds) represented by files 114-118 must be downloaded from the server 104 to the JVM 112. Typically the server 104 is part of a distributed network of computers, such as the Internet, or in some cases could be part of an intranet type of arrangement. In any case, the files 114-118 that are required for the JVM 112 to run the applet 110 include Java class files as well as resource files that are used to support the execution of the applet 110. Such class files, includes a main class file, main.class 114, that is used by the JVM 112 as an entry point for execution of the applet 110. The server 104 also stores other class files such as b.class 116 that are used by the JVM 112 in the furtherance of executing the applet 110. Various image and sound components used in the execution of the applet 110 are stored in resource files such as c.image 118.

In order for the JVM 112 to execute the applet 110, it may be required to download some of the class and resource files as needed. This is typically accomplished by sending a file request that takes the form of an http request to the server 104 which responds by providing an http response that includes the URL of the requested file. By way of example, the JVM 112 issues a request to retrieve the main class file main.class 114 to which the server 104 responds by sending (i.e., downloading) the requested file (i.e., main.class 114). This request/ response procedure is followed for every file for which the JVM 112 requires to execute the applet 110.

This arrangement is satisfactory for executing most small applets on small, local networks. However as the complexity of the applet increases (thereby increasing both the size and the number of requested files), the performance of the JVM 112 may be substantially degraded since the time required to satisfy the increasingly voluminous requests for the increasingly larger files in an increasingly more complex network of computers becomes greater.

With the introduction of what is referred to as a Java Archive (JAR) file, the performance of network Java applications, such as applets, is somewhat improved. A JAR file has a platform-independent file format that aggregates many files into one. In those applications using JAR files, multiple Java applets and their requisite components (.class files, images and sounds, etc.) can be bundled in a JAR file and subsequently downloaded to a browser in a single HTTP transaction thereby greatly improving the download speed. In addition, the JAR format also supports compression, which reduces the file size, further improving the download time. For example, referring to FIG. 2, the applet component files 114-118 are stored in a single JAR file 120. Using this arrangement, in order for the JVM 112 to execute the applet 110, only a single HTTP file request 122 is required to download the compressed JAR file 120 that contains all the applet component files 114-118.

A Java.net.URLClassLoader ("URLClassLoader") class loader may be used for loading classes and resources that are accessed by searching a set of URLs. The URLs can refer either to directories or to JAR files.

A JAR file can define a hierarchical structure that includes one or more folders that include files. In this case, when the files are subsequently extracted for access, the folders are created and the files are placed in the appropriate folders.

SUMMARY OF THE INVENTION

A method is used in managing application features. A first XML file is extracted from a first JAR file, and a second XML file is extracted from a second JAR file. Based on an identifier that is common to the first and second XML files and a directory structure that is common to the first and second JAR files, a merging operation is executed on the first and second XML files. An application feature is derived from the results of the merging operation.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an illustration of example merging software code that may be used with the invention; and FIG. 7-8 are illustrations of XML content that may be used with the invention.

DESCRIPTION OF EMBODIMENT(S)

Described below is a technique for use in managing application features. In accordance with the technique, XML merging can be provided to dynamically extend features of an application.

Two common reasons for utilizing JAR files are to (1) group together a number files by appropriate criteria and (2) easily transport a group of files from one place to another. In a Java environment, JAR files contain executable code files and other relevant files such as image files. The Java environment has the capability to examine the contents of the JAR files and find the code to execute. In an example implementation, an application that utilizes the technique includes several JAR files. In addition, in one deployment option, the JAR files are located on a storage system, e.g., an EMC CLARiiON storage system. These JAR files are downloaded ("pulled") from the storage system and onto a workstation so that the JAR files may be executed (to run the application) on the workstation. The Java SDK URLClassLoader mechanism allows for dynamically including JAR files and classes into the system at runtime.

In at least one implementation also described below, use of the technique helps provide, within a GUI framework for an application, an ability to merge XML at runtime based on a defined set of XML files or a directory name. In such an implementation, when a directory name is provided the application automatically loads all XML files in that directory and merges them. For example, in deploying the application based on Java, the application has multiple separate JAR files which are included in a runtime path. If JAR files contain a same directory structure, the application can make use of XML merging between the JAR files.

Such XML merge and deployment processes help support creation of an application that can be extended after being deployed. For example, disjoint application plug-ins can extend upon each other without having to interact beforehand.

Figure 1:
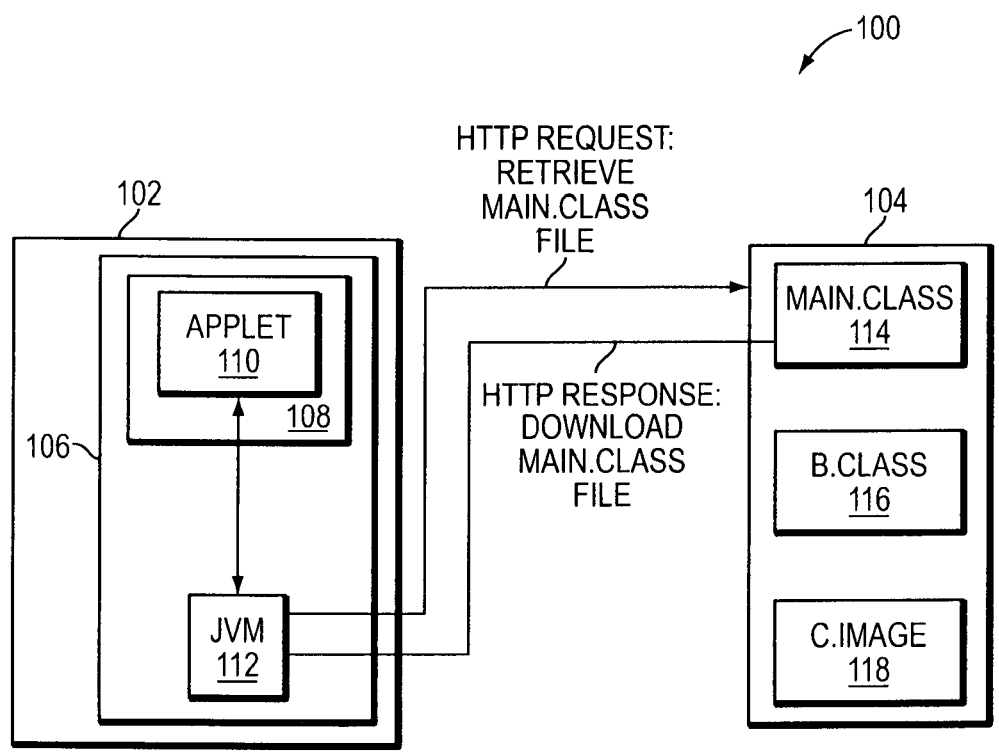
FIGS. 1-2 are illustrations of Java based-systems.
Figure 2:
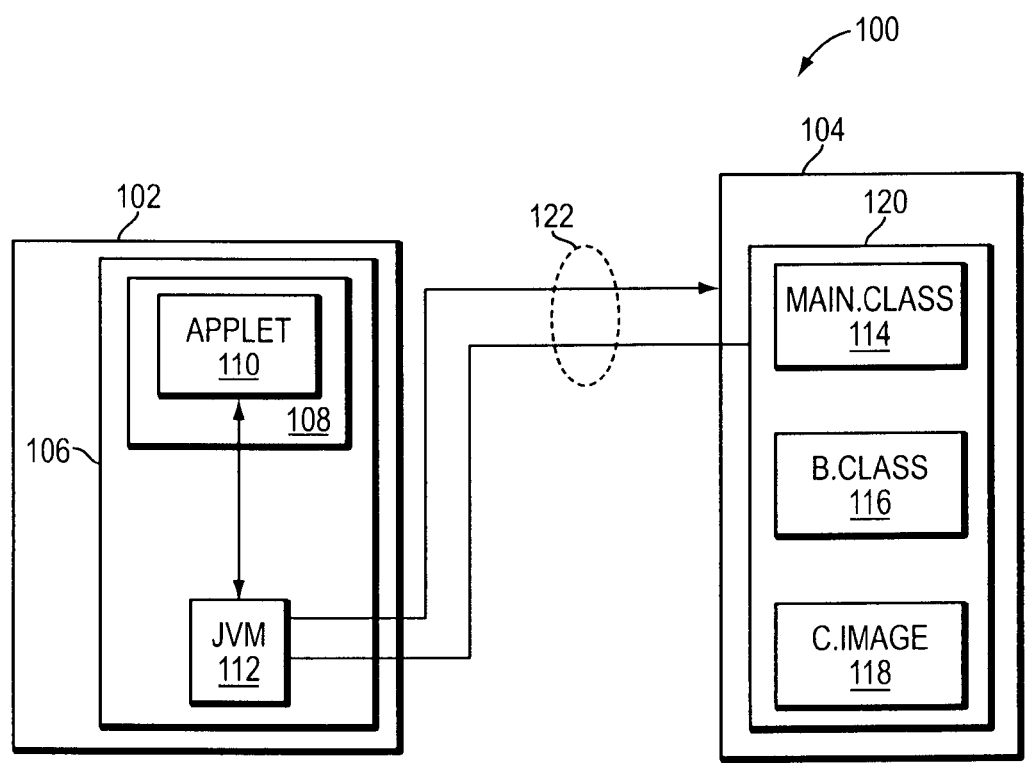
Figure 3:
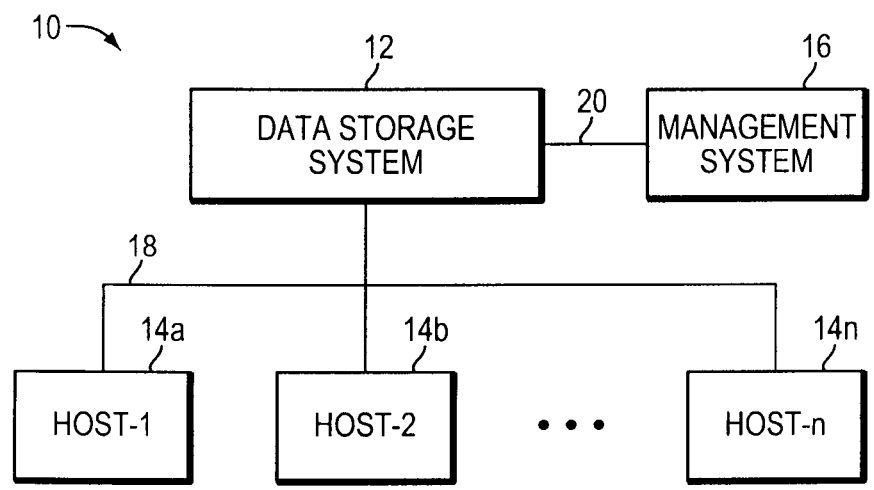
FIG. 3 is an illustration of an example data storage system that may be used with the invention.

Referring now to FIG. 3, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 3 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 3, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Components of the management system 16 may include a graphical user interface (GUI) application which includes a Java applet making network calls to a management interface in data storage systems 12, may be used in connection with interfacing with a user, such as a data storage system manager. The GUI may be used to obtain input in connection with inquiries to be made regarding one or more of systems 12. The GUI may also be used in connection with displaying output, for example, in response to obtaining information for requested inquiries regarding the one or more of systems 12. The GUI may be used in connection with one or more applications for performing system management of one or more of systems 12.

FIGS. 4-8 illustrate an example, described in more detail below, in which one development team provides an plug-in (represented by XML x 440 depicted in FIG. 7) to a GUI framework that displays subsections 520a-520e of section 510 of a GUI screen 490 for use by the user in managing a system 12. Another development team wants to add a link subsection 520f ("Launch Replication Manager", represented by XML y 450 depicted in FIG. 8) to section 510. In accordance with the technique, the link can be added at runtime without any changes to the plug-in or GUI framework software code.

Figure 4:
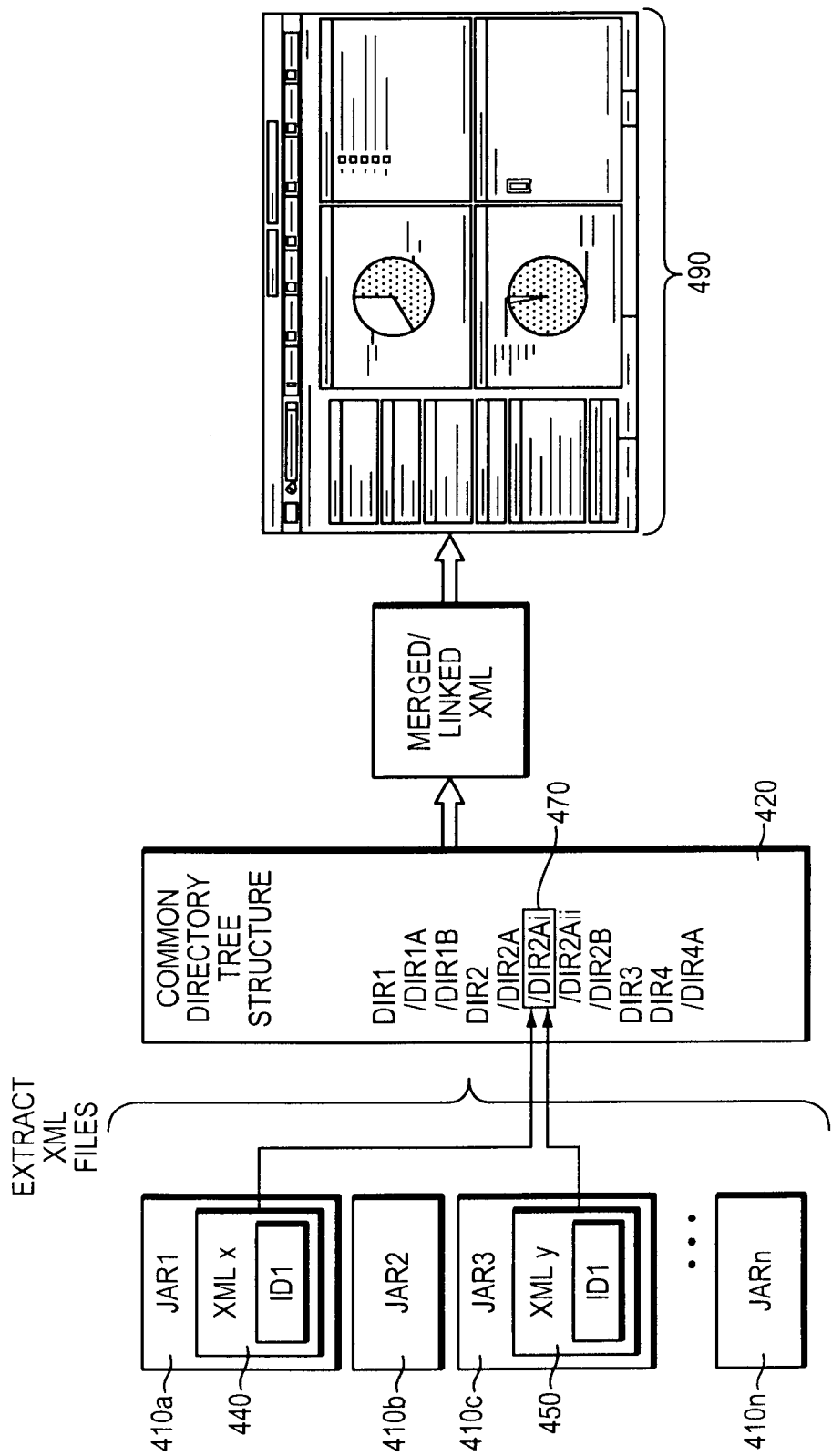
FIG. 4 is a block diagram illustration of an example process that may be used with the invention.
Figure 5:
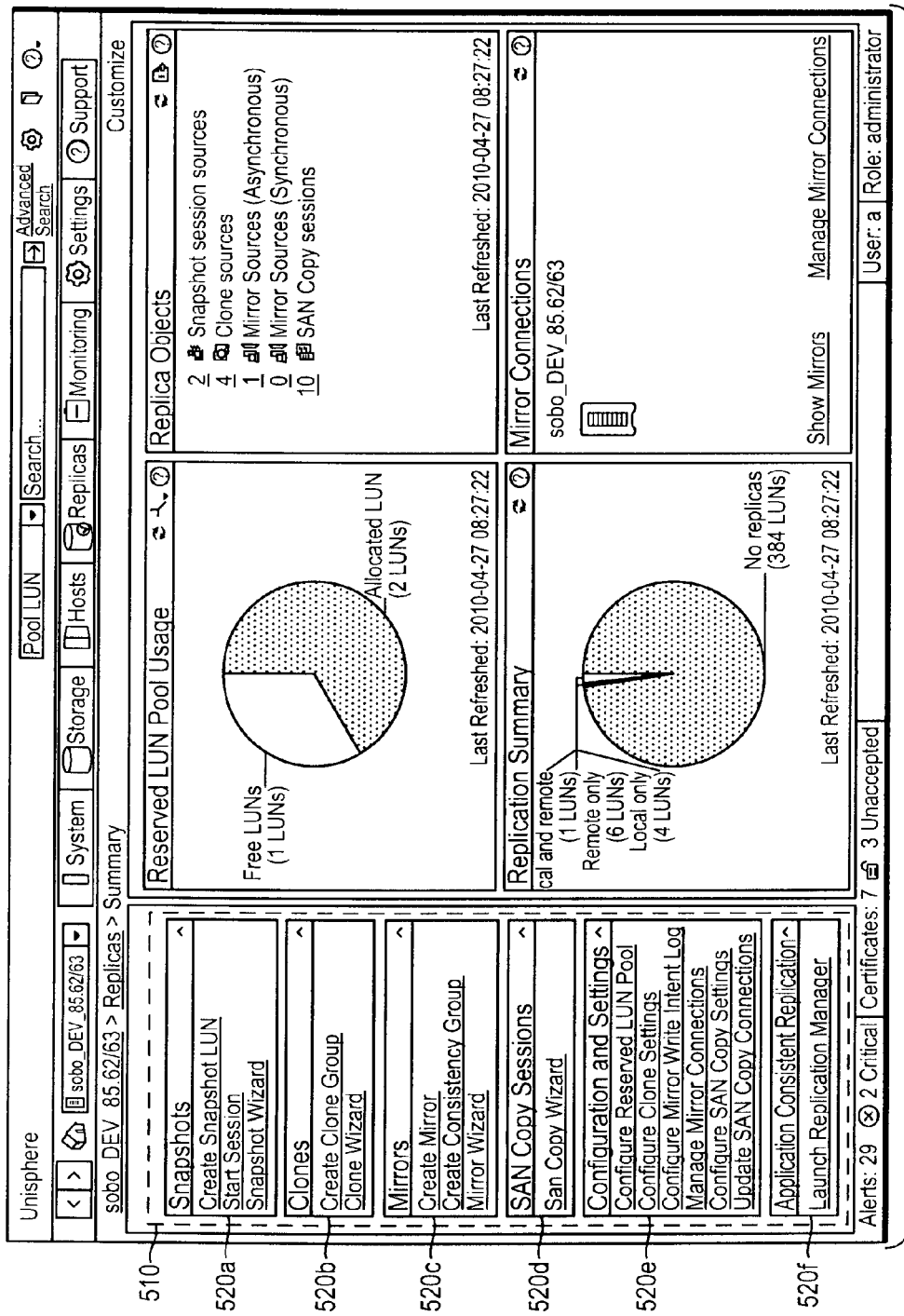
FIG. 5 is an illustration of an example user interface screen that may be used with the invention.

FIG. 4 illustrates an example of basic flow in accordance with at least one implementation using the technique. Multiple JAR files JAR1-JARn 410a-410n are used to deploy an application producing GUI screen 490. In the example, JAR3 410c may be supplied separately from the other JAR files. Each JAR file includes one or more XML files. Internally, all of the JAR files have directory structures that are consistent with a common directory tree structure 420 so that when XML files are extracted from the JAR files into structure 420, XML files from different JAR files but having the same path can be treated as being located in the same directory or subdirectory (exemplified by "/DIR2Ai"), as explained further below. After extraction, merged/linked XML can be produced from which GUI screen 490 can be derived.

For example, XML x 440 may be or include XML listed in FIG. 7 as having path "scr\config\replicas\subsection\replicas-tasks\" as shown within full pathname 710, and XML y 450 may be or include XML listed in FIG. 8 as having the same path "scr\config\replicas\subsection\replicas-tasks\" as shown within full pathname 810. Thus, when XML x 440 is extracted from JAR1 and XML y 450 is extracted from JAR3, both XML x 440 and XML y 450 end up in the same directory "scr\config\replicas\subsection\replicas-tasks\", with filenames "tasklist-replicassection.xml" and "rm-tasklist-replicas-section.xml" respectively.

In such a case, XML merging and/or XML linking as described below may be used to cause XML x 440 and XML y 450 to be processed together as if XML x 440 and XML y 450 were part of the same XML file and functionality. In particular, XML x 440 and XML y 450 share a common identifier ID1. As shown in FIG. 7, a "collapsiblePanes" portion of XML x 440 has an identifier 720 and a "collapsiblePanes" portion of XML x 450 has an identifier 820; since these identifiers 720, 820 are the same ("REPLICAS_TASKS_SECTION_ID"), the "collapsiblePanes" portion of XML x 440 can be treated as incorporating the "collapsiblePanes" content of XML x 450 for the purposes of producing section 510. Such treatment causes subsection 520*f* to be included in section 510 instead of in its own or other section.

Within an XML file, a link can be provided to a directory or a file. This can be helpful to make XML more readable and can also increase application performance and reduce memory.

A directory link merges all files in the directory.
Directory Example:
<xmllink dir="services/settingssection/subsection">
A file link provides a link to another file.
File Example:
<xmllink file="services/settingssection/subsection/file.xml">

XML merge support allows multiple XML files to be merged together and treated as one, which is useful for the GUI framework such that it allows the framework to define common XML into which plug-ins can contribute.

For example, the framework can define a common dashboard with a few common components, and plug-ins can add components to the dashboard simply by adding an XML file in the appropriate directory. The plug-in's XML file is provided in a JAR file of the plug-in, not the framework.

One way to use XML merging is by using the directory link feature above. Otherwise a method such as a FxXMLLoader::readAnMergeXML method (FIG. 6) can be used.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing application features, the method comprising:
    extracting a first extensible markup language (XML) file from a first java archive (JAR) file;
    extracting a second XML file from a second JAR file;
    based on an identifier that is common to the first and second XML files and a directory structure that is common to the first and second JAR files, executing a merging operation at runtime on the first and second XML files, wherein the first and second XML files are processed together as if they were part of the same XML file and functionality, wherein the first XML file and the second XML file are from different JAR files having the same path so that the first and second XML files can be treated as being located in the same directory, and the first XML file and the second XML file have the same directory structure, wherein the first and second XML files share a common identifier so that a first portion of the first XML file is treated as incorporating a second portion of the second XML file for the purposes of producing a GUI section; and
    deriving an application feature dynamically from the results of the merging operation such that disjoint application plug-ins extend upon each other without having to interact before the merging operation, wherein the application feature is dynamically derived after the application for which it was derived for has been deployed.

2. The method of claim 1, wherein XML merging is used to dynamically extend features of an application.

3. The method of claim 1, wherein JAR files are downloaded from a storage system and onto a workstation so that the JAR files may be executed on the workstation.

4. The method of claim 1, wherein within a graphical user interface (GUI) framework for an application, XML is merged at runtime based on a defined set of XML files.

5. The method of claim 1, wherein when a directory is identified an application automatically loads all XML files in that directory and merges all the XML files.

6. The method of claim 1, wherein in deploying an application based on Java, the application has multiple separate JAR files which are included in a runtime path.

7. The method of claim 1, wherein XML merge and deployment processes help support creation of an application that can be extended after being deployed.

8. The method of claim 1, wherein a plug-in is provided to a GUI framework that displays subsections of a section of a GUI screen and a link subsection is added to the section at runtime without any changes to the plug-in or GUI framework software code.

9. The method of claim 1, wherein multiple JAR files are used to deploy an application producing a GUI screen and internally all of the JAR files have directory structures that are consistent with a common directory tree structure.

10. The method of claim 1, wherein internally the JAR files have directory structures that are consistent with a common directory tree structure so that when XML files are extracted from the JAR files, after extraction, merged/linked XML can be produced from which a GUI screen can be derived.

11. The method of claim 1, wherein when XML files are extracted from the JAR files, XML merging is used to cause XML files to be processed together as if the XML files were part of the same XML file and functionality.

12. The method of claim 1, wherein when XML files are extracted from the JAR files, XML files share a common identifier, causing a GUI subsection to be included in a first GUI section instead of in a second GUI section.

13. A system having a memory storing executable instructions for use in managing application features, the system comprising:
    first hardware logic configured to extract a first XML file from a first JAR file;
    second hardware logic configured to extract a second XML file from a second JAR file;

third hardware logic configured to execute, based on an identifier that is common to the first and second XML files and a directory structure that is common to the first and second JAR files, a merging operation at runtime on the first and second XML files, wherein the first and second XML files are processed together as if they were part of the same XML file and functionality, wherein the first XML file and the second XML file are from different JAR files having the same path so that the first and second XML files can be treated as being located in the same directory, and the first XML file and the second XML file have the same directory structure, wherein the first and second XML files share a common identifier so that a first portion of the first XML file is treated as incorporating a second portion of the second XML file for the purposes of producing a GUI section; and fourth hardware logic configured to derive an application feature dynamically from the results of the merging operation such that disjoint application plug-ins extend upon each other without having to interact before the merging operation, wherein the application feature is dynamically derived after the application for which it was derived for has been deployed.

14. The system of claim 13, wherein XML merging is used to dynamically extend features of an application.

15. The system of claim 13, wherein JAR files are downloaded from a storage system and onto a workstation so that the JAR files may be executed on the workstation.

16. The system of claim 13, wherein within a GUI framework for an application, XML is merged at runtime based on a defined set of XML files.

17. The system of claim 13, wherein when a directory is identified an application automatically loads all XML files in that directory and merges all the XML files.

* * * * *